United States Patent
Franzen et al.

(10) Patent No.: US 8,996,159 B2
(45) Date of Patent: Mar. 31, 2015

(54) HANDLING SYSTEM FOR CONTAINERS

(75) Inventors: Hermann Franzen, Moenchengladbach (DE); Armin Wieschemann, Oberhausen (DE); Jannis Moutsokapas, Monheim (DE)

(73) Assignee: Terex MHPS GmbH, Düsseldorf (DE)

( * ) Notice: Subject to any disclaimer, the term of this patent is extended or adjusted under 35 U.S.C. 154(b) by 0 days.

(21) Appl. No.: 13/884,855

(22) PCT Filed: Nov. 9, 2011

(86) PCT No.: PCT/EP2011/069750
§ 371 (c)(1),
(2), (4) Date: May 10, 2013

(87) PCT Pub. No.: WO2012/062807
PCT Pub. Date: May 18, 2012

(65) Prior Publication Data
US 2013/0236279 A1    Sep. 12, 2013

(30) Foreign Application Priority Data
Nov. 11, 2010    (DE) .......................... 10 2010 060 504

(51) Int. Cl.
*G06F 7/00*    (2006.01)
*B60P 1/64*    (2006.01)
(Continued)

(52) U.S. Cl.
CPC ............. *B60P 1/6418* (2013.01); *B65G 63/004* (2013.01); *G05D 1/0061* (2013.01); *G05D 2201/0205* (2013.01); *B65G 67/02* (2013.01)
USPC ........... 700/229; 700/213; 700/214; 700/228; 700/230

(58) Field of Classification Search
None
See application file for complete search history.

(56) References Cited

U.S. PATENT DOCUMENTS

| | | | |
|---|---|---|---|
| 3,474,877 A | 10/1969 | Wesener | |
| 3,669,206 A | 6/1972 | Tax et al. | |

(Continued)

FOREIGN PATENT DOCUMENTS

| | | |
|---|---|---|
| CN | 201619572 U | 11/2010 |
| CN | 201619620 U | 11/2010 |

(Continued)

OTHER PUBLICATIONS

English translation of International Preliminary Report on Patentability from corresponding International Application PCT/EP2011/069750.

(Continued)

*Primary Examiner* — Yolanda Cumbess
(74) *Attorney, Agent, or Firm* — Gardner, Linn, Burkhart & Flory, LLP

(57) ABSTRACT

A handling system for containers includes an automated zone in which floor-bound, rubber-tired and driverless container transport vehicles are used which transport containers between container bridges and a container storage facility. A non-automated zone is provided in which floor-bound, rubber-tired and manned container transport vehicles are used, the container transport vehicles being optionally operable in a driverless or manned mode and thus being optionally transportable in the automated zone or the non-automated zone. A corresponding container transport vehicle which can be connected to an auxiliary device for control in the manned mode is characterized in that the auxiliary device comprises a driver's cab that is equipped with a control system for steering, motion control and braking in the manned mode, the container transport vehicle having a detachable fastening possibility for the driver's cab at the front face of the vehicle.

22 Claims, 2 Drawing Sheets

(51) Int. Cl.
    *B65G 63/00*     (2006.01)
    *G05D 1/00*     (2006.01)
    *B65G 67/02*     (2006.01)

(56) References Cited

U.S. PATENT DOCUMENTS

| | | | |
|---|---|---|---|
| 4,162,869 | A | 7/1979 | Hitomi et al. |
| 4,215,759 | A | 8/1980 | Diaz |
| 4,361,202 | A | 11/1982 | Minovitch |
| 6,129,026 | A | 10/2000 | LeCroy |
| 8,108,090 | B2 | 1/2012 | Bauer |
| 8,128,064 | B2 | 3/2012 | Franzen et al. |
| 2005/0131645 | A1 | 6/2005 | Panopoulos |
| 2011/0238208 | A1* | 9/2011 | Kleine .................. 700/218 |

FOREIGN PATENT DOCUMENTS

| | | |
|---|---|---|
| DE | 1153641 | 8/1963 |
| DE | 8103755 | 2/1981 |
| DE | 19613386 A1 | 10/1997 |
| DE | 10116927 A1 | 10/2002 |
| DE | 202007016156 U1 | 3/2007 |
| DE | 102007030098 A1 * | 1/2008 |
| DE | 102007039778 A1 | 2/2009 |
| DE | 202010001496 U1 | 6/2010 |
| EP | 0302569 B1 | 5/1991 |
| EP | 2119663 A2 | 11/2009 |
| EP | 2060472 B1 | 4/2011 |
| WO | 2009019330 A1 | 2/2009 |
| WO | 2011023868 A1 | 3/2011 |
| WO | 2012062808 A1 | 5/2012 |

OTHER PUBLICATIONS

English Translation of WO 2012/062808 corresponding to commonly owned, co-pending U.S. Appl. No. 13/884,186, filed May 8, 2013.

International Search Report and Written Opinion of the International Searching Authority from corresponding Patent Cooperation Treaty (PCT) Application No. PCT/EP2011/069750, mailed Mar. 21, 2012.

German language International Preliminary Report on Patentability from corresponding Patent Cooperation Treaty (PCT) Application No. PCT/EP2011/069750 mailed Oct. 18, 2012.

* cited by examiner

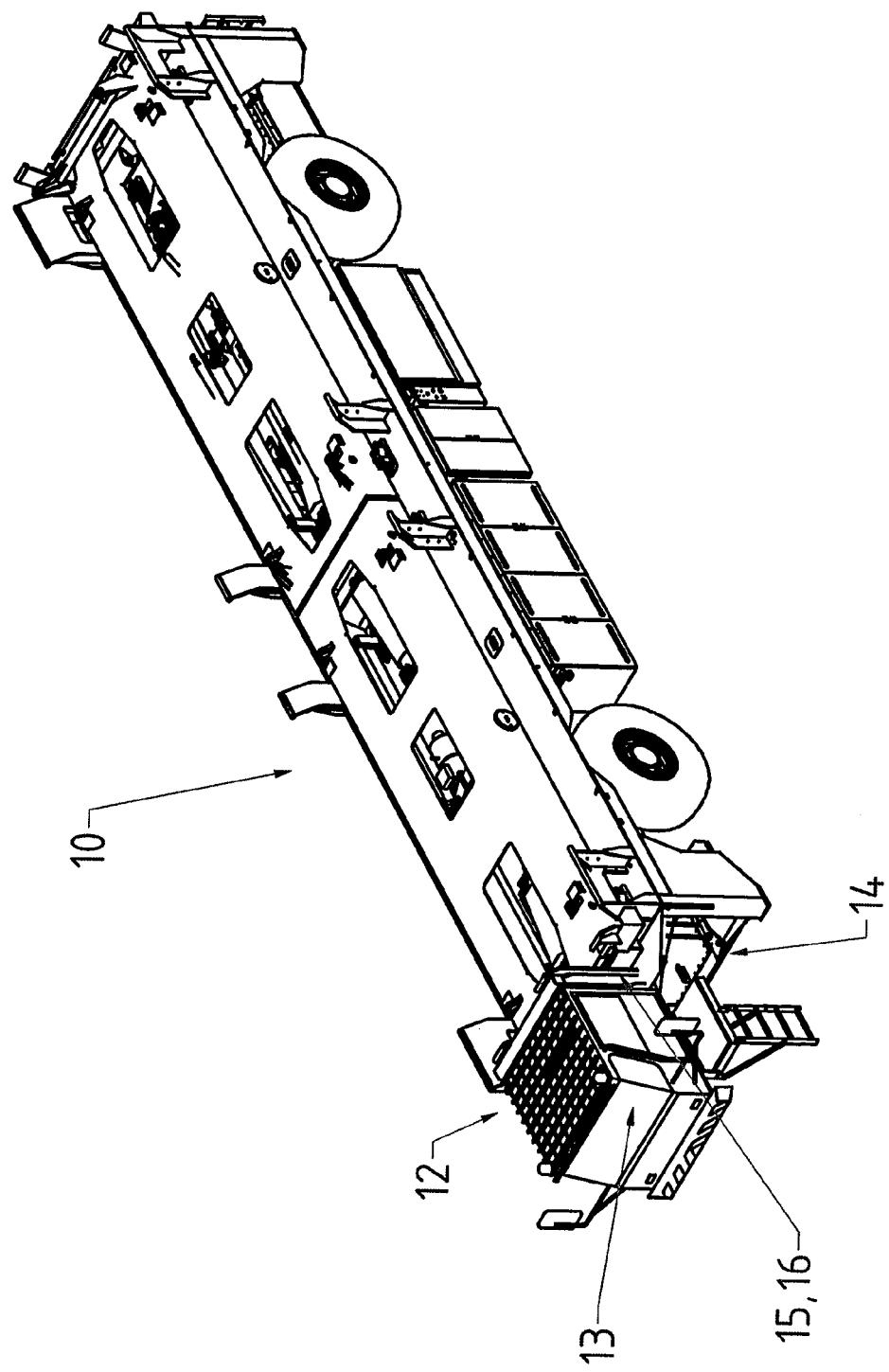

HANDLING SYSTEM FOR CONTAINERS

CROSS REFERENCE TO RELATED APPLICATION

The present application claims the priority benefits of International Patent Application No. PCT/EP2011/069750, filed on Nov. 9, 2011, and claims benefit of DE 10 2010 060 504.2, which are hereby incorporated herein by reference in their entireties.

BACKGROUND OF THE INVENTION

The invention relates to a system for handling containers having at least one automated area in which ground-travelling, rubber-tyred and driverless container transport vehicles are used, which transport containers between container bridges and a container store.

The invention also relates to a ground-travelling, rubber-tyred container transport vehicle which can be operated in a driverless or manned manner as selected, wherein the container transport vehicle is fitted with a control system for driverless operation, which can be brought into operative connection with the travel drive and/or the steering and/or the braking system, which has means for inputting and storing possible travel routes and a transport task, means for automatically determining the vehicle position in space, means for controlling the movement of the container transport vehicle in dependence upon its position in space and upon the preset transport task, and means for braking the container transport vehicle in the presence of obstacles, and the container transport vehicle can be connected to an auxiliary device for control during manned operation.

Handling systems, i.e. systems for loading and unloading vehicles, ships and railways, and for storing containers are known.

In the known systems manned means and transport vehicles on the one hand, and driverless or unmanned means and transport vehicles, for example so-called automated guided vehicles (AGVs) on the other hand, are used for container handling and container transportation. Manned means or transport vehicles are understood to be those which are actively controlled by drivers or vehicle operators travelling with the vehicle. In contrast to this, driverless or unmanned means or transport vehicles are controlled during automated operation without active operation by a driver. "Unmanned" or "driverless" relates only to the actual intervention of a driver in the control process. In this sense, unmanned automated operation of a corresponding means or of a transport vehicle can also be provided when a driver is travelling with the vehicle but does not actively intervene in the control.

Thus from EP 0 302 569 B1 a storage and transfer system for containers is known, including a quay with quayside cranes for loading and unloading container ships which are moored at the said quay, a container storage depot which is provided with a group of gantry crane tracks disposed next to each other, a number of vehicles not guided on rails for transportation of containers between the quayside cranes and the gantry cranes, and means for automated control of the vehicles. The means for automated or driverless control of the vehicles include a freely programmable path selection system able to guide each vehicle along pre-programmed positions in the quay area without guide tracks. Each vehicle is provided with a navigation device to determine the path to take and to compare this path with the desired path, a reference grid of transponders and/or induction wires is disposed in, on or below the road surface of the quay area, and each vehicle is provided with one or a plurality of transceiver units which determine the position of the vehicle by mutual influence with the said reference grid in order to transmit signals to the control device of the vehicle so as to correct the vehicle position.

These so-called driverless transport vehicles or AGVs are ground-travelling, rubber-tyred conveying means with their own travel drive, which are controlled in an automated manner, i.e. without a driver or vehicle operator travelling with them, and are guided in a contact-free way. These are defined for example in VDI guideline 2510.

Corresponding vehicles are also known from DE 10 2007 039 778 A1, in which a ground-travelling transport vehicle is disclosed for the transportation of containers with at least one lifting platform which is disposed on a vehicle frame of the transport vehicle and which, by means of a lifting drive, can be raised from a lowered transport position into a raised transfer position, or can be lowered in the reverse case. The lifting platform is attached to the vehicle frame by at least one knee lever, wherein the lifting platform can be raised or lowered via the at least one knee lever, and the lifting drive acts upon the at least one knee lever and guides the lifting platform for the lifting and lowering movement on the transport vehicle.

From DE 196 13 386 A1 a counterbalance forklift truck is known, which can be operated in a manned or driverless manner as selected and is provided with a fork for handling pallets and loads located thereon. For driverless automated operation, the ground-travelling handling equipment is fitted with a control system which can be brought into operative connection with the travel drive and/or the steering and/or the braking system and/or the movement control of the fork. Furthermore, the vehicle includes means for inputting and storing possible travel routes and a transport task, means for autonomously determining the vehicle position in space, means for controlling the movement of the vehicle in dependence upon its position in space and upon the preset transport task, means for recognising the presence, position and orientation of a pallet, means for controlling the movement of the fork and/or of the vehicle in dependence upon the position, the orientation of the pallet and the transport task and means for braking the vehicle in the presence of obstacles.

From patent application U.S. Pat. No. 6,129,026 A a system for handling air freight in an airport area between baggage check-in points or baggage claim areas and waiting aircraft is known. Transport vehicles are used for this handling which function in a mixed operation and thus change between manned operation controlled by a driver and driverless automated operation. The transport vehicles are moved in an automated and driverless manner along power rails in a partial area of the apron and on the way to the baggage check-in points or baggage claim areas. Since the positions of waiting aircraft are never identical, the transport vehicles are controlled by a driver when approaching the aircraft area.

From the German utility model document DE 20 2007 016 156 U1 gantry lifting trolleys, so called straddle carriers, are known which also function in mixed operation during transportation and stacking of containers. The straddle carrier is moved to a container stack in a manned manner. Introducing the straddle carrier to pick up or put down containers above the topmost container of a container stack is carried out by automated steering—which can be activated by the driver—with a laser scanner.

SUMMARY OF THE INVENTION

The object of the invention is to create an improved system for handling containers and a ground-travelling, rubber-tyred container transport vehicle suitable for this purpose.

In accordance with an embodiment of an aspect of the invention a system for handling containers, having at least one automated area in which ground-travelling, rubber-tyred and driverless container transport vehicles are used which transport containers between container bridges and a container store, is improved in that at least one manual area is provided in which ground-travelling, rubber-tyred and manned container transport vehicles are used which transport containers between the container bridges and the container store, wherein each of the container transport vehicles can be operated in a driverless or manned manner as selected and can therefore travel in the automated area or in the manual area as selected. In this way container handling at interfaces between an automated area and a manual area becomes unnecessary. A driver merely has to climb in or out or possibly remain seated but inactive if this meets safety regulations.

The creation of completely driverless automated operation of the whole system can be effected step-by-step in that gradually the manual area is reduced and the automated area increased, wherein all container transport vehicles which are initially actively still controlled by drivers are accordingly gradually converted to automated driverless operation. It is also feasible in this respect for a driver to travel with the container transport vehicle during driverless operation but in so doing only passively to carry out a monitoring function and actively to intervene in the otherwise automated vehicle control only in the event of an emergency or a malfunction.

Furthermore, malfunction of the automated and driverless control or of the primary control unit of the automated container transport vehicles in driverless operation is not so problematic as previously since a driver merely has to climb into the affected container transport vehicle and actively control it until the repair has been carried out. In the converse case of a driver becoming incapacitated such a system also advantageously offers flexibility since the operation of the container transport vehicle can be converted to driverless automated operation.

The system is further improved in that, in the automated area and the manual area, container transport means are used which pick up and put down containers in the region of the container bridges and/or of the container store for loading and unloading the container transport vehicles.

In a particular manner, provision is made for each container transport means to be operable in a driverless or manned manner as selected.

The degree of automation of a corresponding system can advantageously be increased still further in that, in the region of the container bridges and/or of the container store, the containers can be picked up and put down automatically by the container transport vehicles.

The ground-travelling container transport vehicles are preferably AGVs which can be operated in a manned manner by means of an auxiliary device.

In particular, the auxiliary device includes a driver's cabin which is provided with a control system for steering, movement control and braking in manned operation.

The auxiliary device can usefully be actuated via a security circuit so that during manned operation the take-over of control by a driver is carried out in a controlled manner and not by accident.

In a preferred embodiment the driver's cabin is releasably attached to the front end face of the ground-travelling container transport vehicle. It is thus designed as an add-on component which is flange-mounted on the front of the container transport vehicle or AGV.

The driver's cabin should adopt an elevated position and allow the driver a good overall view. In addition, passive safety elements for protection of the driver's cabin and of the driver inside it are provided, such as a bracing system in the form of a roll over protective structure.

A roll over protective structure (abbreviated to ROPS) is a protective structure for driver's cabins. It consists of additional stiffened frame and lattice elements which are incorporated into the construction of the driver's cabin. In the event of a so-called exceptional incident, such as tipping or rolling over, the construction prevents excessive deformation of the driver's cabin. The driver is protected from injury since the survival space (the so-called deflection limiting volume, abbreviated to DLV) is secured. One possibility for expanding the protective structure is an extension by means of an ROPS. In this case the driver's cabin is also protected against falling objects.

In order for the control system provided for manned operation for active control of the container transport vehicle by a driver from the driver's cabin to be able to influence the container transport vehicle, the control system has an interface for connection to the vehicle control of the AGV, and the control system is designed to intervene, after activation, in the vehicle control of the AGV and to take it over. In the simplest case, the driver's cabin can be connected to the container transport vehicle by a plug-in cable connection.

In accordance with an embodiment of another aspect of the invention an improved ground-travelling, rubber-tyred container transport vehicle which can be operated in a driverless or manned manner as selected, wherein the container transport vehicle is fitted with a control system for driverless operation which can be brought into operative connection with the travel drive and/or the steering and/or the braking system, which control system has means for inputting and storing possible travel routes and a transport task, means for automatically determining the vehicle position in space, means for controlling the movement of the container transport vehicle in dependence upon its position in space and upon the preset transport task and means for braking the container transport vehicle in the presence of obstacles, and the container transport vehicle can be connected to an auxiliary device for control during manned operation, is achieved in that the auxiliary device includes a driver's cabin which is provided with a control system for steering, movement control and braking in manned operation, and the container transport vehicle has a releasable attachment means for the driver's cabin on the front end face.

In one advantageous embodiment provision is made for the container transport vehicle to have an interface for coupling of the control system for manned operation to the vehicle control.

Further details, features and advantages of the invention will become clear from the following description of an exemplified embodiment with reference to the drawings.

BRIEF DESCRIPTION OF THE DRAWINGS

FIG. 1 is a plan view of a schematic illustration of a system for handling containers in a port and FIG. 2 is a perspective view of a container transport vehicle which can be operated in an automated or manual manner as selected.

DESCRIPTION OF THE PREFERRED EMBODIMENTS

Figure 1:
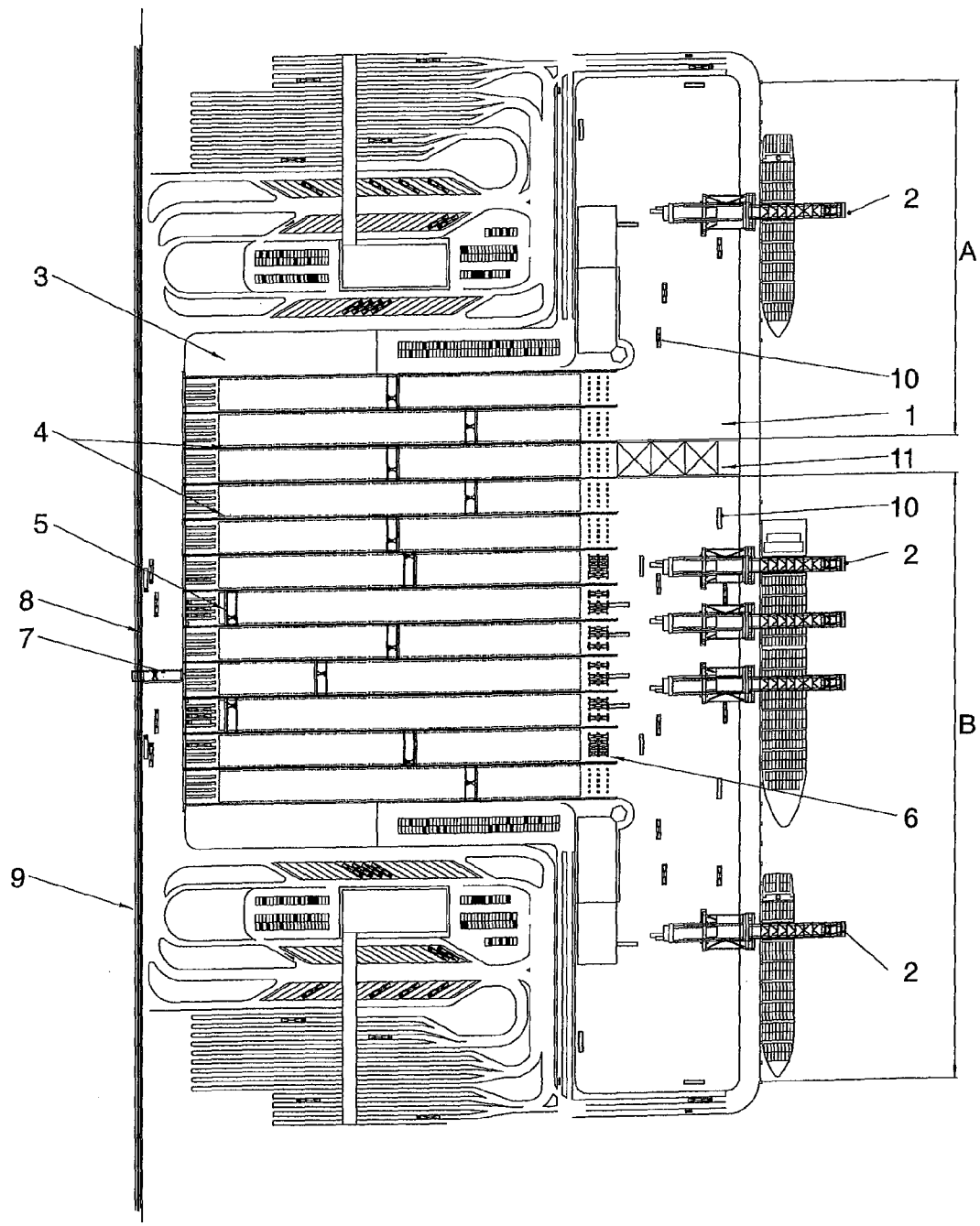

FIG. 1 is a plan view of a schematic illustration of a system for handling containers in a port with a quay 1 at which ships are moored for loading and unloading.

A plurality of container bridges 2 are provided for this purpose and extend with their booms over the ships on the one side and the quay 1 on the other.

The system also includes a container store 3 of a known type with a large number of store lanes 4 which are each served by one or a plurality of first gantry cranes 5 which can travel on railways extending along the store lanes 4.

On the side of the container store 3 facing the quay 1, transfer locations 6 are disposed in front of each store lane 4, at which locations containers are set down in order to be placed into, or removed from, the container store 3.

On the land side of the container store 3 facing away from the quay 1, a lorry and/or rail transfer area is disposed. In this area containers which are either being removed from the container store 3 or placed into the container store 3 can be loaded onto, or removed from, lorries and wagons.

To this end, the land-side transfer area includes a plurality of second gantry cranes 7 with rotatable lifting mechanisms for loading and unloading the lorries at the transfer locations 8 or railway wagons on a section of rail track 9.

On the quay 1, the containers unloaded from the ships are either set down by the container bridges 2 or the containers for loading onto the ships are picked up.

Container transportation on the quay 1 takes place using ground-travelling container transport vehicles 10 which usually have pneumatic rubber tyres and can travel thereon freely and, in particular, not on rails.

These are usually automated and therefore driverlessly operated transport vehicles, i.e. AGVs. The container transport vehicle 10 shown in FIG. 2 is also designed as an AGV and, in the manner of a flat-bed vehicle, has two mutually separated loading surfaces disposed one behind the other for one container to be set down on in each case. Alternatively the loading surfaces can be designed to be able to be raised and lowered using lifting devices. Corresponding AGVs or container transport vehicles 10 can naturally also be designed as gantry lifting trolleys or straddle carriers and therefore also be suitable for stacking containers.

The quay 1 is divided into at least one automated area A for container transportation in which driverless container transport means, i.e. container transport vehicles 10 formed as AGVs such as straddle carriers are used, and into at least one manual area B for container transportation in which manned container transport means are used.

In addition to driverless automated operation, the container transport vehicles 10 can also, in accordance with the invention, be operated in a manned manner as selected. In this way the container transport vehicles 10 can be used both as unmanned container transport means without a driver in the automated area A and also as manned container transport means with a driver in the manual area B.

For safety reasons the automated area A is protected against the entry of people, for example by a fence and electronic access barriers at the access points.

Accordingly, the automated area A and the manual area B are also separated by a security checkpoint 11.

The security checkpoint 11 prevents undesired access by people or drivers and also prevents container transport vehicles 10 from passing over from the manual area B into the automated area A and vice versa.

It will be understood that desired and intentional and permitted access or passage into the respective other area is possible under specific circumstances.

Such circumstances would be, for example, the intentional access of maintenance personnel for repair work in the automated area A or even the desired passage of a container transport vehicle 10 from one area to the other. This is possible while maintaining security measures such as, for example, the driver exiting his vehicle and leaving the security checkpoint 11 if the container transport vehicle 10 has passed into the automated area A, and possible electronic confirmation etc.

In order to permit this, the container transport vehicles 10, which are fundamentally designed as AGVs, can be fitted when necessary and/or permanently with an auxiliary device which permits manned operation and in particular control by a driver.

The auxiliary device includes essentially a driver's cabin 12, which is provided with a control system 13 for manned operation of the container transport vehicle 10 and in particular for steering, movement control and braking by a driver. Such control systems are known per se from container transport vehicles which can be operated exclusively in a manned manner with a driver.

The activation of the auxiliary device or the take-over of control of the container transport vehicle 10 by the control system 13 and the driver in manned operation is effected via a security circuit after two-fold confirmation. Therefore, unintentional switching on and off of the automated operation or of the manned operation of the container transport vehicles 10 is prevented.

The control system 13 is then designed in such a way that after activation there is intervention in the vehicle control of a container transport vehicle 10 thus far operated in an automated or driverless manner and the driver takes over.

The driver's cabin 12 is releasably disposed at an elevated position at the front end 14 of the container transport vehicle 10, i.e. it can be removed from the container transport vehicle 10 since it is connected thereto merely by removable holding means such as, for example, bolts, and electrically or by other power and signal transmission means.

It is also fitted with passive safety elements for protection of the driver's cabin 12 and of the driver therein, such as a bracing system in the form of a roll over protective structure.

In order to permit control of the container transport vehicle 10 by a driver from the driver's cabin 12, a control system 13 for manned operation is disposed therein. In order for this control system to be able to act upon the container transport vehicle 10 an interface 15 for connection to the vehicle control is provided by which the driver's cabin 12 is connected to the container transport vehicle 10 by a plug-in cable connection 16 when it is being mounted.

If the container transport vehicle 10 is used in a driverless manner in purely automated operation, the driver's cabin 12 can be removed.

The ground-travelling container transport vehicle 10 which can be operated in a driverless or manned manner thus has—for driverless operation—a control system which can be brought into operative connection with the travel drive and/or the steering and/or the braking system, which has means for inputting and storing possible travel routes and a transport task, means for automatically determining the vehicle position in space, means for controlling the movement of the container transport vehicle 10 in dependence upon its position in space and upon the preset transport task and means for braking the container transport vehicle 10 in the presence of obstacles.

In addition, the container transport vehicle 10 is provided for manned operation with a driver's cabin 12 having a control system 13 for steering, movement control and braking in manned operation.

REFERENCE LIST

1 quay
2 container bridges 3 container store
4 store lanes
5 first gantry cranes
6 transfer locations
7 second gantry cranes
8 transfer locations
9 section of rail track
10 container transport vehicle
11 security checkpoint
12 driver's cabin
13 control system
14 front end
15 interface
16 cable connection
A automated area
B manual area

The invention claimed is:

1. A system for handling containers comprising: a plurality of driverless container transport vehicles and a plurality of manned container transport vehicles for ground-travelling, wherein said driverless and said manned container transport vehicles include rubber tires and travel on the ground, wherein said driverless and said manned container transport vehicles transport containers between container bridges and a container store, said system further comprising at least one manual area wherein only said manned container transport vehicles are operated and at least one automated area wherein only said driverless container transport vehicles are operated, wherein each of the container transport vehicles can be selectively operated in a driverless or manual mode and will travel in the designated automated area or in the manual area based on the selection, and wherein the automated area and the manual area are in separate locations from each other.

2. A system according to claim 1, wherein the automated area is protected against access by people.

3. A system according to claim 2, wherein a security checkpoint is disposed to prevent drivers with container transport vehicles from driving into the automated area from the manual area.

4. A system according to claim 1, wherein between the automated area and the manual area a security checkpoint is disposed to prevent drivers in manned container transport vehicles from driving into the automated area from the manual area.

5. A system according to claim 4, wherein a container transport means for loading and unloading the container transport vehicles is provided in each automated area and manual area; wherein said container transport means load and unload containers in the region proximate to the container bridges, the container store, or both.

6. A system according to claim 5, wherein each container transport means can be operated in a driverless or manned manner as selected.

7. A system according to claim 5, wherein in the region of the container bridges and/or of the container store, the containers can be picked up and put down automatically by the container transport vehicles.

8. A system according to claim 5, wherein the container transport vehicles are AGVs and wherein the AGVs may be operated manually by an auxiliary device.

9. A system according to claim 8, wherein the auxiliary device includes a driver's cabin said driver's cabin including a control system for steering, movement control and braking the AGV in a manual mode operation.

10. A system according to claim 9, wherein the auxiliary device can be actuated via a security circuit.

11. A system according to claim 9, wherein the driver's cabin is releasably attached to the front end face of the ground-travelling container transport vehicle.

12. A system according to claim 9, wherein the control system includes an interface to be connected to a vehicle control of the AGV and to manually control the AGV and wherein the control system is designed to intervene and override the control of the AGV after activation.

13. A system according to claim 1, wherein the automated area and the manual area each comprises container transport means to load and unload the containers on the container transport vehicles in the region proximate the container bridges, the container store, or both.

14. A system according to claim 13, wherein each container transport means can be selectively operated in a driverless or manned mode.

15. A system according to claim 13, wherein the containers are loaded and unloaded automatically by the container transport vehicles in the region proximate to the container bridges, the container store, or both.

16. A system according to claim 1, wherein the container transport vehicles are AGVs and wherein the AGVs must operated manually by an auxiliary device.

17. A system according to claim 16, wherein the auxiliary device includes a driver's cabin said driver's cabin including a control system for steering, movement control and braking the AGV in a manual mode.

18. A system according to claim 17, wherein the auxiliary device can be actuated via a security circuit.

19. A system according to claim 17, wherein the driver's cabin is releasably attached to the front end face of the container transport vehicle.

20. A system according to claim 17, wherein the control system includes an interface to be connected to a vehicle control of the AGV and to manually control the AGV and wherein the control system is designed to intervene and override the control of the AGV after activation.

21. A container transport vehicle which can be selectively operated in a driverless or manual mode, wherein said container transport vehicle comprises rubber tires and travels on the ground; wherein the container transport vehicle is fitted with a control system for driverless operation and is operatively connected with at least one of: a travel drive, steering, or braking system, wherein said control system further includes means for inputting and storing possible travel routes and a transport task; means for automatically determining the vehicle position in space; means for controlling the movement of the container transport vehicle in dependence upon its position in space and upon the preset transport task; and means for braking the container transport vehicle in the presence of obstacles; and wherein the container transport vehicle can be connected to an auxiliary device for manual control during manned operation, said auxiliary device includes a driver's cabin and said driver's cabin includes a control system for steering, movement control and braking in said manual mode, and wherein the container transport vehicle has a releasable attachment means for the driver's cabin on the front end face.

22. Container transport vehicle as claimed in claim 21, wherein the container transport vehicle includes an interface for coupling of the control system of said driver's cabin for manned operation to a vehicle control.

* * * * *